US009532390B2

(12) United States Patent
John et al.

(10) Patent No.: US 9,532,390 B2
(45) Date of Patent: Dec. 27, 2016

(54) METHOD, APPARATUS AND SYSTEM FOR IMPLEMENTING PDN CONNECTIONS

(71) Applicant: Futurewei Technologies Inc., Plano, TX (US)

(72) Inventors: Kaippallimalil Mathew John, Richardson, TX (US); Hinghung Anthony Chan, Plano, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 40 days.

(21) Appl. No.: 14/514,179

(22) Filed: Oct. 14, 2014

(65) Prior Publication Data

US 2015/0103665 A1 Apr. 16, 2015

Related U.S. Application Data

(60) Provisional application No. 61/890,751, filed on Oct. 14, 2013, provisional application No. 61/972,118, filed on Mar. 28, 2014.

(51) Int. Cl.
*G01R 31/08* (2006.01)
*H04W 76/02* (2009.01)
*H04W 36/00* (2009.01)

(52) U.S. Cl.
CPC ......... *H04W 76/02* (2013.01); *H04W 36/0011* (2013.01); *H04W 76/022* (2013.01); *H04W 76/021* (2013.01)

(58) Field of Classification Search
CPC ............... H04W 76/02; H04W 76/022; H04W 36/0011; H04W 76/021
See application file for complete search history.

(56) References Cited

U.S. PATENT DOCUMENTS

| 8,995,335 | B2 * | 3/2015 | Vainikka ........................ 370/328 |
| 2005/0198363 | A1 * | 9/2005 | Ling .................. H04W 36/0011 709/236 |
| 2008/0019338 | A1 | 1/2008 | Ishi et al. |
| 2010/0296448 | A1 | 11/2010 | Vainikka et al. |
| 2011/0058479 | A1 | 3/2011 | Chowdhury |
| 2012/0269128 | A1 | 10/2012 | Nylander et al. |
| 2012/0303835 | A1 | 11/2012 | Kempf et al. |
| 2013/0170435 | A1 | 7/2013 | Dinan |
| 2013/0272181 | A1 | 10/2013 | Fong et al. |
| 2015/0103665 | A1 * | 4/2015 | Kaippallimalil ...... H04W 76/02 370/235 |

* cited by examiner

*Primary Examiner* — Robert Wilson
(74) *Attorney, Agent, or Firm* — Slater Matsil, LLP

(57) ABSTRACT

A method, apparatus and system related to a packet data network (PDN) connection for a radio access network (RAN) are provided. The PDN connections between eNB of the RAN and an Evolved Packet Core (EPC) are forward though Ethernet switching network. A controller at Evolved Packet Core (EPC) site such as EPC controller or centralized switch controller is configured to configure flow table entries along the transport path from eNB to a gateway of the EPC.

19 Claims, 11 Drawing Sheets

METHOD, APPARATUS AND SYSTEM FOR IMPLEMENTING PDN CONNECTIONS

CROSS REFERENCE

This application claims priority of U.S. Provisional patent application Ser. No. 61/890,751 entitled LAYER 2 EPC SESSION HANDLING filed Oct. 14, 2013, and U.S. Provisional patent application Ser. No. 61/972,118 filed Mar. 28, 2014 entitled DIRECT ETHERNET TRANSPORT FOR PACKET DATA NETWORK CONNECTIONS IN 5G WIRELESS NETWORKS, the teachings of which are incorporated herein by reference in their entirely.

TECHNICAL FIELD

This disclosure is generally directed to packet data network connections, and more particularly to a method, apparatus and system for implementing PDN connections.

BACKGROUND

Wireless devices are becoming more diverse with not just billions of phones but also possibly a much larger number of sensors, machines contributing to machine-to-machine communication, and practical everything in the so called Internet of Things (IoT). With an anticipated growth in several orders of magnitude of the number of these devices by year 2020, dense radio networks may likely emerge. Both data and signaling from mobile devices are expected to grow exponentially over the next five or more years. However, localized data traffic patterns may dominate. A centralized architecture in mobile networks such as the Third Generation Partnership Project (3GPP) network to serve all the wireless nodes with a centralized core network is then not efficient. Meanwhile, the Internet peering model is undergoing a transformation from a hierarchical model to a flatter one where tier 2 and tier 3 Internet Service Providers (ISPs) can connect directly with each other without having to always route packets between them via connections to tier 1 ISP. The evolution from a centralized mobile core network towards a more distributed network is then a clear trend.

5G wireless services will require capabilities to support more diverse applications with a much larger range of delay tolerance and data rates than in the current mobile networks. The METIS project in EU FP-7 is exploring a mobile network for year 2020 with much higher bandwidth and lower latencies using multiple radio access technologies. The current 3GPP Evolved Packet Core (EPC) network (Section II.A) relies on lengthy backhauls to the centralized core. End user Packet Data Network (PDN) connections are transported over either a General Radio Packet Service Tunneling Protocol (GTP) tunnel or a proxy mobile IP (PMIP) tunnel, over which the user's IP data packet is encapsulated. The PDN connections are backhauled over various transport networks including Multiprotocol Label Switching (MPLS) to rather centralized EPC nodes, adding delay and complexity to the provisioning of the entire path. In addition, as the total number of end user connections increase in the future, continued centralization of EPC networks will require the support of even larger sets of connection state in the transport plane. In distributed EPC networks, the backhaul to the radio network will naturally be shorter, and the connection state more manageable.

SUMMARY

This disclosure is directed to a method, apparatus and system for implementing PDN connections.

As an aspect of present disclosure, a communications network apparatus comprises at least one controller at EPC site, configured to communicate with at least one of an evolved Node B (eNB) and an Ethernet switching network device of an Ethernet switching network via which packet data network (PDN) connections are carried between the eNB and the EPC. The at least one controller at EPC site configured to configure flow table entries for an PDN connection between the eNB and the EPC to a forwarding table in the last one of the eNB and the Ethernet switching network device to enable an PDN connection over Ethernet communication between the eNB and the EPC via the Ethernet switching network, the flow table entries comprising a virtual media access control (MAC) reference corresponding to the PDN connection between the eNB and the EPC.

As another aspect of present disclosure, an Ethernet switching network device for use in an Ethernet switching network is provided, which is configured to be coupled between an evolved Node B (eNB) of a first radio access network (RAN) and an enhanced packet core (EPC). The Ethernet switching network device is configured to forward packet data carried on a packet data network (PDN) connection between the eNB and the EPC based on a forwarding table comprising flow table entries configured by a controller at EPC site for the PDN connection, the flow table entries comprising a virtual media access control (MAC) address corresponding to the PDN connection.

As another aspect of present disclosure, a radio access network node for used in a first radio access network (RAN) which is configured to be coupled to a packet data network (PDN). The radio access network node is configured to establish a Packet Data Network (PDN) connection via an Ethernet switching network to an interface of the PDN and comprises:

a receiver configured to receive a first data packet of the PDN connection from a user equipment (UE);

an Ethernet interface for communicating with the Ethernet switching network;

a processing unit configured to: convert the received first data packet to an Ethernet formatted packet; and forward the Ethernet formatted packet via the Ethernet switching network to the interface of the PDN based on a forwarding table comprising flow table entries that are configured by a controller at EPC site for the PDN connection, the flow table entries comprising a virtual Media Access Address (MAC) corresponding the PDN connection.

As another aspect of present disclosure, a system for controlling a first radio access network (RAN) comprising an evolved Node B (eNB) which is configured to communicate to a Packet Data Network (PDN) via an Ethernet switching network to enable a PDN connection over Ethernet communication; the system comprising:

an Evolved Packet Core (EPC) controller at EPC site having connection session control functions;

a centralized switch controller at EPC site;

wherein the centralized switch controller configured to in response to a request of setup of PDN connection, configure flow table entries for an PDN connection between the eNB and the EPC to a forwarding table in the last one of the eNB and the Ethernet switching network device to enable an PDN connection over Ethernet communication between the eNB and the EPC via the Ethernet switching network, the flow table entries comprising a virtual media access control (MAC) reference corresponding to the PDN connection between the eNB and the EPC.

In some embodiments, the Ethernet switching network device is an Ethernet switch, for example a Layer 2 anchor (L2-ANC) or a Layer 3 anchor (L3-ANC). L2-ANC may serve as the anchor point for supporting mobility of a user equipment (UE). L3-ANC may be the anchor for an Internet Protocol (IP) session.

According to various aspects of this disclosure, a PDN connection over Ethernet communication can be implemented. The solution can improve networks capable of supporting 5$^{th}$ Generation (5G) wireless services having more diverse applications and a much larger range of delay tolerance and data rates.

BRIEF DESCRIPTION OF THE FIGURES

For a more complete understanding of the present disclosure, and the advantages thereof, reference is now made to the following descriptions taken in conjunction with the accompanying drawings, wherein like numbers designate like objects, and in which.

DETAILED DESCRIPTION

Technology trends including network function virtualization and software defined networking (SDN) provide a means to scale, manage and operate a highly distributed network with control functions that would not have been possible in a dedicated node or server based approach. Virtualization of EPC functions and network provide the opportunity to have a controller that has a view of the transport resources available for the PDN connections. With the development of carrier grade Ethernet based on Transport Interconnection of Lots of Links (TRILL) and Shortest Path Bridging (SPB) routing instead of Spanning Tree Protocol (STP), it is possible to build a robust Ethernet backhaul transport network with short convergence times and good network utilization. The advantages of virtualizing PDN connection handling with a controller at EPC site, for example a (centralized) switch controller coupled to EPC controller or EPC controller itself (comprising switch controller), along with a carrier grade, routed Ethernet network are significant especially in small cell and future dense cell radio deployments.

This disclosure provides the backhaul of mobile PDN connections in distributed EPC networks that can simply be transported directly by Ethernet while relying on centralized controllers and virtualization. This disclosure provides the model and mechanisms with virtualization of both control and network entities to setup PDN connections over an Ethernet transport plane between an eNB and the gateway to a network, such as the Internet. This disclosure outlines its advantages and analyzes some of the challenges to realize such transport.

In 4G Wireless, which is dominated by 3GPP with Long Term Evolution (LTE)—Advanced for the radio access network and with EPC for the mobile core network, the PDN connection management is complex. In the current centralized 3GPP EPC architecture, GTP tunnels are used to transport PDN connections. Virtualization which also separates the control and data planes will be able to support decentralization of the EPC. In addition, advances in TRILL and SPB routing will provide the ground for using Ethernet transport directly instead of tunneling while providing the connection management capabilities required in mobile networks.

3GPP EPC Architecture

Figure 1:
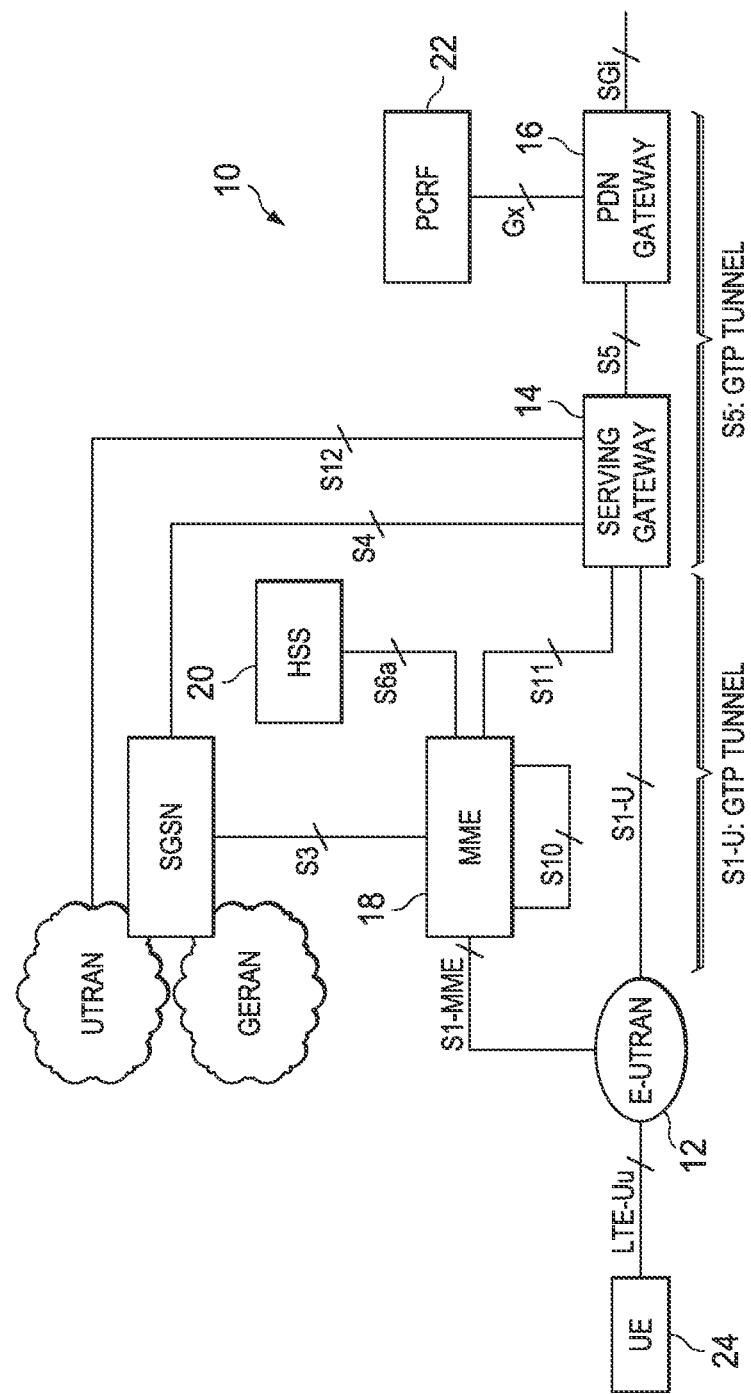
FIG. 1 illustrates a high level view of the 3GPP Long Term Evolution (LTE)/EPC architecture.

FIG. 1 illustrates a 3GPP Long Term Evolution (LTE)/EPC architecture at 10 according to 3GPP 23.401. It consists of an Evolved-Universal Terrestrial Radio Network (E-UTRAN) 12 and an EPC mobile core network. The EPC provides a rich set of mechanisms for end user session and connection management. It therefore has a number of functional entities including the following: Serving Gateway 14 and PDN Gateway 16 are in the data path; Mobility Management Entity (MME) 18, Home Subscriber System (HSS) 20, and Packet Control and Rule Function (PCRF) 22 are control plane functions. This architecture supports authentication and establishment of connections on demand, quality of service (QoS) policy and charging, mobility of established connections, and other session handling capabilities. In addition, the EPC also provides backward compatibility to the previous generation radio access networks (RAN): UMTS Terrestrial RAN (UTRAN) and GSM EDGE RAN (GERAN).

End-user connections are established when a User Equipment (UE) 24 powers up and attaches to a network with an Access Point Name (APN). The MME 18 facilitates the signaling to establish the PDN connection segments in the following: S5 interface between the PDN Gateway 16 and Serving Gateway 14, S1-U interface between the eNB of E-UTRAN 12 and Serving Gateway 14, and the radio interface LTE-Uu between E-UTRAN 12 and the UE 24.

In the current LTE architecture, GTP is the most commonly used protocol for tunneling bearer connections. GTP connections from the eNB to PDN Gateway 16 provide a stratified Layer 2 transport over which the UE's IP packets can be tunneled to the PDN Gateway 16 (first hop router for the UE). The GTP control protocol provides QoS policy negotiation capabilities, metering and accounting function, UE location information, load information of the core network elements, keep alive and other connection information. Note that the EPC functional entities are an overlay on a UDP over IP network which in turn is typically over an MPLS network. In the data plane, for example, the connection between the E-UTRAN 12 and the Serving Gateway 14, as well as that between the Serving Gateway 14 and the PDN Gateway 16, may be connected through several internet protocol (IP) and MPLS routers not shown in the figure. Such transport with extensive layering is replaced by direct Ethernet transport according to this disclosure described below. In addition, a centralized EPC results in long backhaul. The trend towards decentralization is enabled by network virtualization.

Network Virtualization

The network segments that are virtualized in this disclosure are those between the eNB (S1-U) of E-UTRAN 12 and the PDN gateway (GW) 16 interface (SGi) to the Internet/external network. A centralized switch/transport path controller has an overall view of the network topology and state. This switch controller is configured to offer its services of setting up the transport path to EPC control functions. OpenFlow and Forwarding and Control Element Separation (ForCES) protocols allow a centralized controller to program distributed switches in the transport plane. However, none of these protocols support the needs of GTP/PDN connections without extension.

OpenFlow specified in Open Networking Forum (ONF) defines a model of controller and switch separation where the forwarding plane functions are programmable. While the model is flexible to work well for packet forwarding, the switches currently perform only forwarding functions which are relatively simpler than PDN connection handling and do not maintain state. Even though extensions are needed, the OpenFlow protocol and its capabilities have promise to support PDN connection handling.

ForCES is specified in Internet Engineering Task Force (IETF) and defines programmable logical functional blocks (LFB). While ForCES provides a flexible model, the challenge for applying it in an EPC network is to construct a well-defined, standard interface to which application specific integrated circuits (ASICs), Network Processing Unit (NPU) or other switch hardware can be implemented.

Other protocols such as H.248, as well as Generalized Switch Management Protocol (GSMP) and its variants, also offer a model that separates the control plane from the transport plane. However, these protocols cannot be used for abstracting a PDN connection without significant extensions and further work.

Aspects of this disclosure provide embodiment decentralized EPC architectures that provide interfaces and mechanisms for supporting a centralized controller and a distributed transport plane from the eNB (S1-U interface) to the gateway to the IP network (SGi interface). EPC control functions—MME, SGW and PGW control planes, PCRF and other supporting functions may be implemented as virtual functions in embodiment decentralized EPC architectures. In some embodiments, EPC control functions may request that the Switch Controller setup the transport path for PDN connections.

Decentralized EPC Architecture

Figure 2:
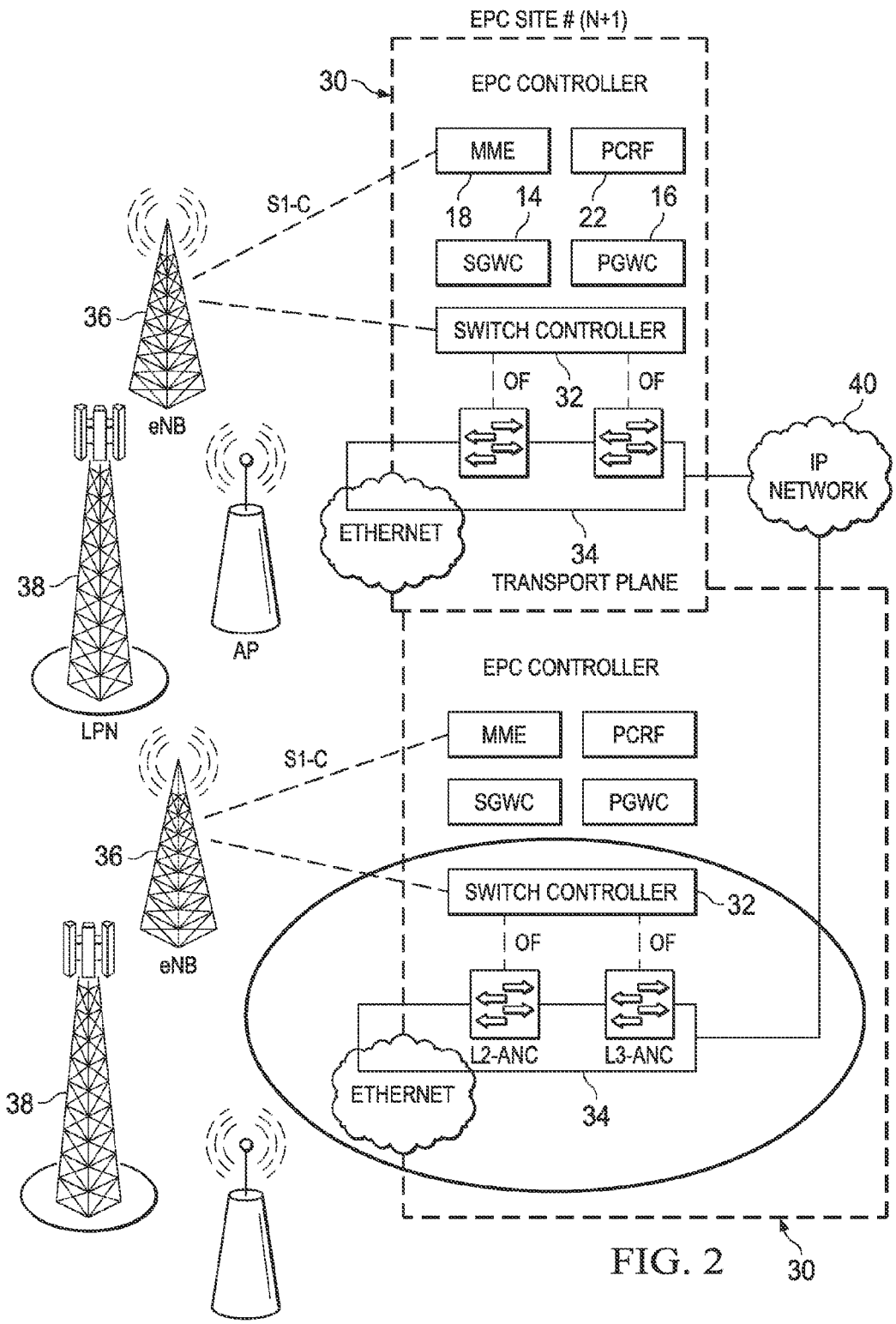
FIG. 2 illustrates a decentralized EPC consisting of multiple EPC sites.

Referring to FIG. 2, a decentralized EPC includes multiple EPC sites 30. The architecture in each EPC site 30 focuses on the interfaces and mechanisms for supporting a centralized EPC controller and a distributed transport plane 34 from the eNB 36 (S1-U interface) in the RAN 38 to the gateway to the IP network 40 (SGi interface) as shown in FIG. 2. The centralized EPC controller comprises connection session control functions MME 18, SGW 14 and PGW 16 control planes, PCRF 22, and other supporting functions are likely to be implemented as virtual functions. Notably, the EPC control functions request the switch controller 32 to set up the transport path for PDN connections.

FIG. 2 illustrates a decentralized EPC architecture. This architecture includes multiple EPC sites 30. The architecture in each EPC site 30 includes EPC control functions, switch controller 32 and the distributed transport plane 34 in each EPC site 30. In the transport plane 34, an L3 Anchor (L3-ANC) is the anchor for the IP session, whereas an L2 Anchor (L2-ANC) serves as the anchor point for supporting mobility of the UE 24 within the RAN 38. In some embodiments, the L2 Anchor and the L3 Anchor are logical entities.

The switch controller 32 may have a complete view of the transport plane 34 from the radio node to the access to the Internet. This centralized view of the entire backhaul network allows it to balance load among the various switching/transport entities in the network, as well as to potentially set up and handover connections with more concurrent message sequences. UE signaling to the 3GPP network is not altered in this architecture. 3GPP NAS (Non-Access Stratum) signaling and S1-C interfaces are used.

Transport of Packet Data Network Connections

FIG. 3 illustrates a diagram comparing a GTP PDN connection transport architecture and an embodiment Ethernet PDN connection transport architecture.

Figure 3A:
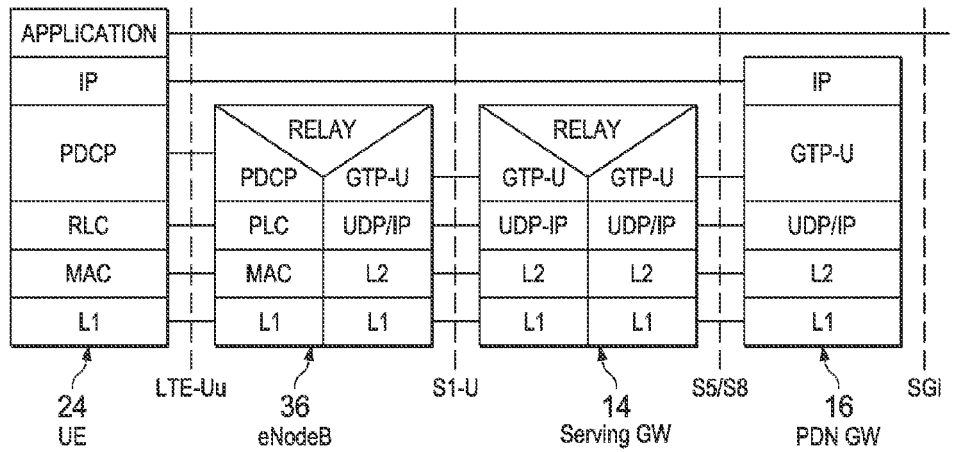
FIG. 3A illustrates the user plane for transporting PDN connections of a UE according to 3GPP architecture specification in TS 23.401.

Conventional 3GPP GTP Tunnel PDN Transport describes the user plane for transporting PDN connections of a UE 24 according to 3GPP architecture specification in TS 23.401 is shown FIG. 3A. GTP-U (and PDCP in radio links) bearers transport the user's IP data packets between the UE 24 and the PDN GW 16. The backhaul network for the PDN bearers between the eNB 36 and PDN GW 16 is an IP network where MPLS may also be used for its carrier grade capabilities.

Figure 3B:
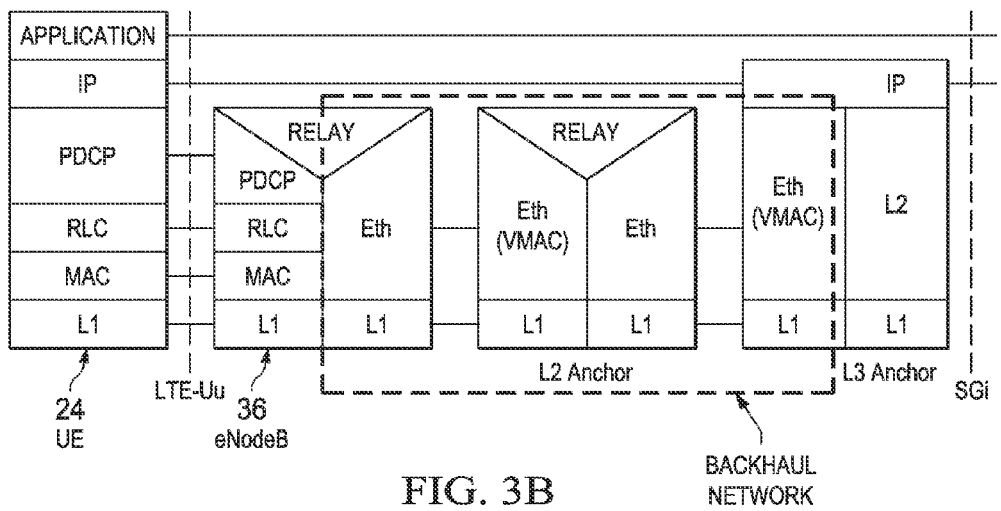
FIG. 3B illustrates transporting PDN connections directly over Ethernet in the backhaul network as the transport plane.

Embodiment Direct Ethernet PDN Transport technique transports PDN connections directly over Ethernet in the backhaul network as the transport plane 34 as shown in FIG. 3B. A UE 24 can have multiple PDN connections, and the network supports this feature using virtual media access control (MAC) address identifying ports on the L2 Anchor and the L3 Anchor. The virtual MAC address may be unique for the set of PDN connections of a single UE. The combination of virtual MAC address and UE IP address can identify the PDN connection uniquely. For carrier grade capabilities, the backhaul network may use TRILL or 802.1aq. A virtual MAC address for each PDN connection is needed to identify the UE connection that may include (point-to-point) PDN connection segments along S1-U and S5. Flow tables for the virtualized network segments (or PDN connection segments) along the transport path are grouped into a point-to-point flow table binding for the PDN connection. The UE may have multiple PDN connections—each of which is identified in the network by a point-to-point flow table binding in the eNB, L2-Anchor and L3-Anchor. The L2-Anchor and L3-Anchor each may be at least part of an Ethernet switch. Thus, the L2 Anchor and L3 Anchors each have virtual MAC addresses for the maximum number of PDN connections allowed per user (usually 9), where the virtual MAC addresses may correspond to point-to-point flow table bindings. The PDN connection is forwarded in the network based on the set of user IP address, RAB (Radio Access Bearer) identity, and virtual MAC addresses at L2 and L3 Anchors. For carrier grade capabilities, the backhaul network may use TRILL or 802.1aq.

Connection Handling

Connection handling includes setting up of the connection path, policy and QoS for the end user IP flows for connection, charging, location information and other aspects. QoS provisioning for these connections are simplified since there is in each EPC site 30 a centralized switch controller 32 that requests and manages priority resources in switches and the radio network. In the backhaul network, QoS is handled by policing on Aggregate Maximum Bit Rate (AMBR) and GTP forwarding uses Diffserv and DSCP classes. This new architecture can support provisioning and policing on AMBR (with extensions to Open Flow) and forwarding of user data packets based on Diffserv and DSCP classes. Charging, location information and other session features can similarly be supported with Open Flow protocol extensions. With a virtualized EPC/session control and switch controller 32 that has full knowledge of the network topology, many operations can be handled concurrently. Connection setup and handover are provided as follows.

Connection Setup

Figure 4:
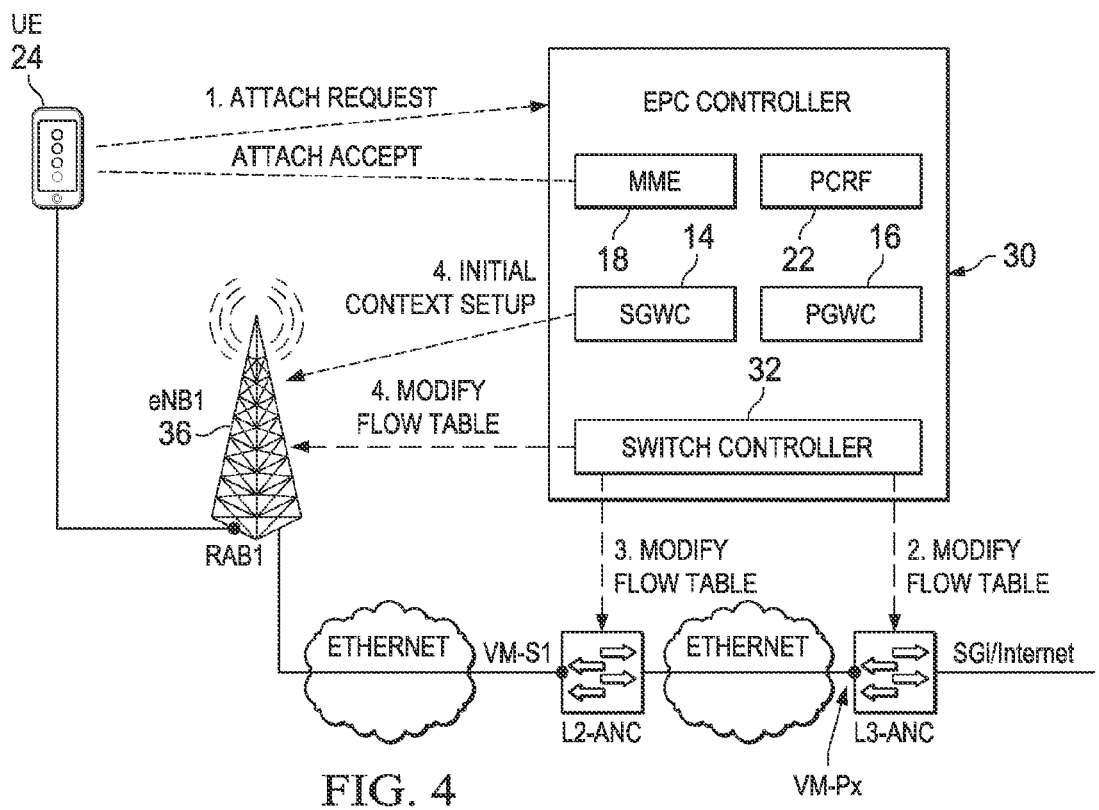
FIG. 4 illustrates the procedure to setup a PDN connection involving the UE initiating signaling to attach to the EPC site in accordance with one embodiment of present disclosure.

FIG. 4 illustrates a diagram of network configuration for establishing a PDN connection in which a UE 24 initiates signaling to attach to the EPC site 30. The EPC authenticates the user and provisions authorization policies. The EPC 1 comprising the connection session control functions MME 18 1 SGW 14 and PGW 16 control planes 1 and PCRF 22 1 authenticates the UE 24 and provisions authorization policies. The EPC controller sets up the connection path between eNB 36 and the L3 Anchor/and the radio access network 38 sets up the radio bearers to the UE 24. This procedure is illustrated in FIG. 4.

To establish the transport path to carry the UE IP data traffic, the EPC controller requests the switch controller to configure flow table entries along the transport path through L3 Anchor, L2 Anchor, and eNB 36. The EPC controller generates a virtual Tunnel Endpoint Identity (TEID) and associates the TEID to tables in the switch. The TEID is carried in the 3GPP S1-C signaling and thus avoids the need to change 3GPP protocols.

As shown in FIG. 4, at step 1, on powering up the UE 24 attempts to attach by sending an Attach Request message with a number of parameters for setting up the PDN connection including its International mobile scriber identity (IMSI), default Access Point Name (APN) (connection to default network, QoS and other protocol options). The MME 18 in the EPC controller obtains authentication vectors from the Home Subscriber Server (HSS) 20 (not shown) and completes a sequence of interactions with the UE 24 to verify its authenticity, and setup keying for subsequent control protocol and for data ciphering. The interactions between MME-HSS are not depicted in FIG. 4.

At step 2, following successful authentication, the EPC controller requests the switch controller 32 to set up a forwarding table in the L3 Anchor for the PDN connection. The switch controller 32 sets up the forwarding table and responds with a local identifier.

At step 3, the EPC controller also requests the switch controller 32 to set up a forwarding table in the L2 Anchor for the PDN connection. The switch controller 32 sets up the forwarding table and responds with a local identifier.

At step 4, when the forwarding tables in the L3 Anchor and the L2 Anchor are configured, the switch controller 32 provides the EPC controller with local identifiers by which the PDN connection segments are identified. The EPC controller creates a TEID to associate with the local identifiers of the PDN connection at L2 Anchor and L3 Anchor. MME 18 responds with Attach Accept/Initial Context Setup and includes the TEID generated along with other connection parameters. The switch controller 32 also modifies the flow table in the eNB 36 corresponding to the backhaul/Ethernet side of the connection. This is identified by the TEID in the flow table modification requests. The eNB 36 is thus able to correlate the requests with the same TEID.

When the above steps are completed, a bearer for carrying IP data traffic is established between the UE and the L3 Anchor.

Handover

Figure 5:
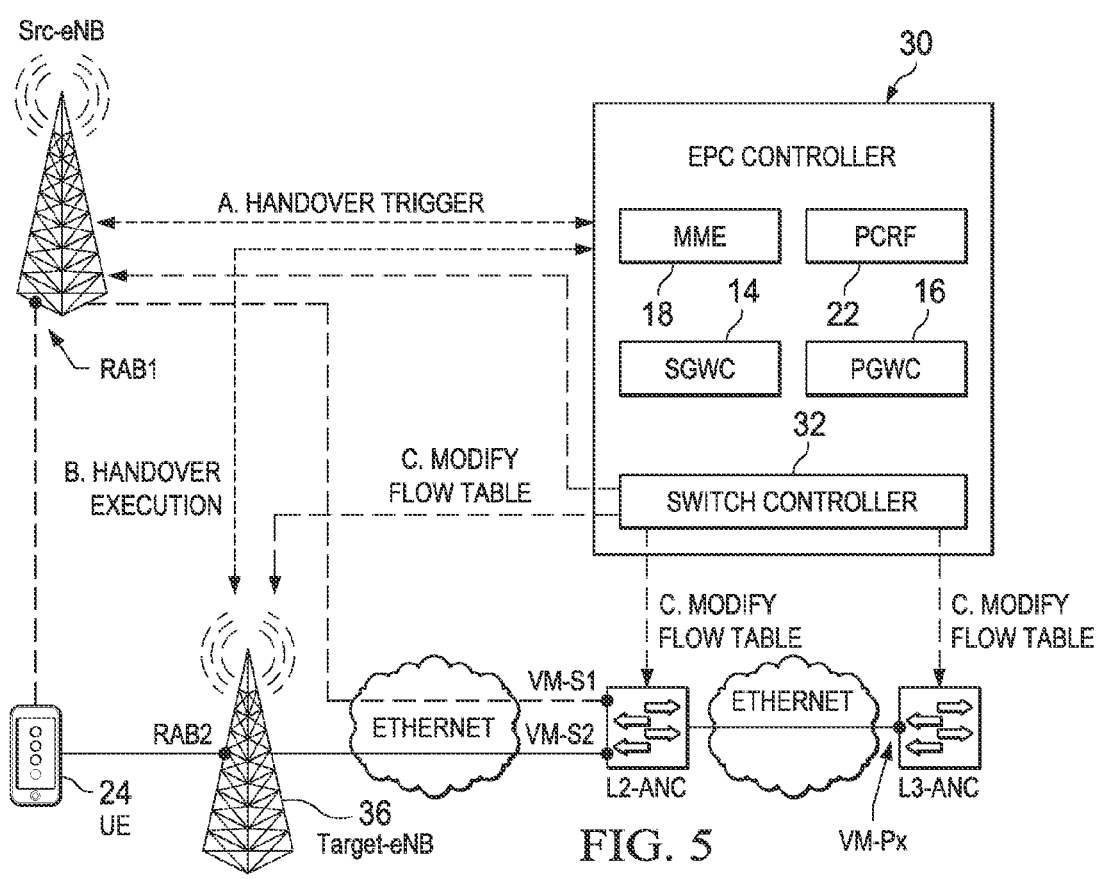
FIG. 5 illustrates the handover sequence of a PDN connection when the PDN connections are moved to a new evolved Node B (eNB) and potentially a new port in the L2 anchor in accordance with one embodiment of present disclosure.

3GPP has a number of handover procedures for PDN connections to support the continuity of an IP session established over the bearers for that PDN connection. Aspects of this disclosure provide handover techniques for moving a PDN connection from one base station to the another. Handover may occur as a result of the UE 24 moving to another eNB 36 or a new L2-Anchor (SGW in 3GPP). FIG. 5 shows the handover sequence of a PDN connection when the PDN connections are moved to a new eNB 36 and potentially a new port in the L2 anchor. In this case, based on measurement reports, eNB1 (initial node) initiates the move to the target eNB2. The handover is initiated by eNB1 sending a request to eNB2. The MME (in the EPC controller) uses the list of PDN bearers received in the Path Switch Request from eNB2 to modify the flow tables along the transport path. On receipt of a handover request from eNB1, the target eNB2 sends a Path switch request to the MME with the bearers that need to be switched. One bearer is depicted by FIG. 5, and the process is similar for other bearers. The MME (in EPC controller) identifies the connection end points in L2 Anchor and eNB2 that need to be changed. The EPC controller retrieves the local connection identifiers based on the TEID of the connection and requests the Switch Controller to remove the old entries and insert new flow table entries corresponding to the move to eNB2. End marker is sent from the L2 Anchor to the source eNB which forwards it to the target eNB2. The MME (EPC controller) also sends a Path Switch Response to the target eNB2. The eNB2 is then ready to forward data traffic for the established bearer(s). The eNB2 sends a release request to eNB1 to clean up local resources and complete the transfer. In some embodiments, the connection identifiers refer to flow table entities in a forwarding table, for example the virtual Media Access Address (MAC), IP address, and so on (referencing FIG. 6).

Similar to this procedure, there could be mobility that involves the change of the L2 Anchor (SGW), or such transfer as a result of failure of the L2 anchor. In this case the EPC controller would have to move the bearer resources to a new L2 Anchor. This can be achieved in implementations that include a centralized EPC controller since the switch controller has a view of the network map and resources available.

Embodiments of the present disclosure provide connection models and mechanisms for setting up PDN connections directly on Ethernet. In such a virtualized network with a central switch controller over the path of the PDN connection, Ethernet OAM along with the network-wide view of the switch controller may be sufficient to provide the services in GTP path management (Echo messages). Since Ethernet's capabilities are used, there is less duplication of effort to manage the path. The user's IP packets are not tunneled as in GTP, and there is no increase in bandwidth requirements as a result, e.g., about five or six percent less bandwidth depending on the traffic mix.

In terms of setting up and managing the PDN connections, the centralized switch controller can optimize setup by performing actions concurrently whereas GTP control messages for setup proceed serially from node to node. The Switch Controller also has a view of location information of various entities on the path, as well as metrics on usage and load. This allows a simple transport model for handling failure and managing handovers.

While GTP requires implementation of core network overload extensions in 3GPP, the centralized switch controller can provide this feedback to EPC session control to re-balance. This keeps the transport protocol simple. An option with respect to taking advantage of a centralized switch controller described here would be to run the user plane of GTP (GTP-U) over Ethernet. This is a viable alternative and essentially a similar transport model, but will incur some extra bandwidth and use path management/echo messages that are redundant since there is a centralized switch controller. There are many benefits to transporting PDN packets directly over Ethernet. Embodiment may be deployed in single provider networks as well as in multiple provider networks. Embodiments can be implemented in carrier, tenant, small cell, and enterprise deployment scenarios.

In one embodiment of the present disclosure, signaling for handover execution in this case is similar to the S1-based handover in 3GPP 23.401 since the EPC controller and switch controller 32 are centralized. The EPC controller can assign new TEID if the port on L2 Anchor is changed. The EPC transport plane 34 needs to respond to the handover trigger from the source eNB 36 and perform handover execution to the target eNB 36. In this process, the flow bindings to the transport plane 34 need to be managed. The handover messages and 3GPP sequences in S1 handover (see 3GPP TS 23.401, Section 5.5.1.2) are not changed. However, the distributed transport plane 34 is setup using Open Flow. Details of handover triggering, handover execution and path switching in the transport plane 34 are as follows.

Handover Trigger

RRC (Radio Resource Control) measurements of the UE 24 obtained by the source eNB 36 are used to determine that a handover is necessary. The source eNB 36 contacts the EPC controller (MME 18) to trigger handover to the target eNB 36.

Handover Execution

The EPC controller functionality (including mobility management, gateway control and policy) are executed to send handover messages as in 3GPP TS 23.401, 5.5.1.2 over the S1 control interface between EPC site 30 and the eNB 36. If the attachment port (to L2 Anchor) needs to be changed, a new TEID may be computed by the EPC controller. The eNB 36 then sends PDN packets to the new port. Since the EPC controller is virtualized and is software based, a number of signaling interactions to handle the handover is simplified. However, no protocol changes are needed and interaction to the eNB 36 including handover commands, confirmation, notification to the target eNB 36 and the release of UE context to the source eNB 36 are handled using current protocol.

Path Switching

Associated to the handover messages over S1 interface (as described above in handover execution), the path of the PDN connection should be moved as the connection is handed over. When the handover request is sent to the target eNB 36, the switch controller 32 is instructed to setup a new path (to port VM-S2 in FIG. 5). Following the completion of handover, the UE context in the source eNB 36 is removed and the switch controller 32 is instructed to free the PDN connection path (to port VM-S1 in FIG. 5).

This section analyzes the advantages of the connection model and mechanisms according to this disclosure for setting up PDN connections directly on Ethernet in the backhaul network as shown in FIG. 3B. The virtualized and distributed PDN transport network shown in FIG. 2 with a centralized switch controller 32 and with network-wide topology and state knowledge is sufficient to provide the services that would otherwise need GTP path management (Echo messages) and the associated processing by each node. In contrast, native Ethernet mechanisms are used in this disclosure so that no additional effort is needed to manage the transport path.

The user's IP packets are not tunneled as in GTP, so that there is no resulting increase in packet size. The comparison in packet size can be calculated as follows in Table I. With GTP tunneling, an IP payload transported over the GTP/UDP/IP tunnel as shown in FIG. 3A above can add up to 56 Bytes with IPv6.

TABLE 1

Comparison of Data Plane

Packet Size - GTP Transport and Direct

| Payload Size (Bytes) | |
|---|---|
| Small | 64 |
| Medium | 800 |
| Large | 1464 |

| | Ethernet transport (Ethernet hdr) | GTP Transport (GTP/UDP/IP/Eth) | Reduction in overhead (%) |
|---|---|---|---|
| Small Packet | 82 | 118 | 31% |
| Medium Packet | 818 | 854 | 4% |
| Large Packet | 1482 | 1518 | 2% |
| Traffic Mix | | | |
| Mobile network (IPv4 based): 50/10/40 (small/medium/large %) | | | 17% |
| Mobile network (IPv6 based) | | | 22% |

Packet size distribution for IPv4 networks shows about 50% of packets around 64 Bytes, and 40% large 1500 Byte packets, with only about 10% over a range of sizes in between. Using these estimates, it can be seen in Table I that transporting PDN connections directly over Ethernet needs about 17% lower bandwidth than over GTP tunnels.

Direct Ethernet transport of PDN combined with network virtualization reduces complexity in the system with simpler OAM, and therefore lower the overall cost.

The centralized switch controller 32 also optimizes connection handling by performing actions concurrently, whereas GTP control messages proceed serially from node to node. The switch controller 32 has a comprehensive view of resources available at various switching entities on the path, as well as metrics on usage and load. This view allows common procedures for handling failure, managing handovers and balancing load.

While GTP requires implementation of core network overload extensions in 3GPP to obtain dynamic load information of the SGW and PDN GW, the centralized switch controller 32 simply uses its view of network resources to enable selection of less loaded transport paths or even rebalance existing connections.

Another embodiment taking advantage of the centralized switch controller 32 described here runs the user plane of GTP (GTP-U) over Ethernet. This is a viable alternative and essentially uses a similar transport model, but will incur some extra bandwidth and use path management/echo messages that are redundant in this model with a centralized switch controller 32. The GTP protocol has separate specification of control and user plane operation, using just the GTP-U with other control mechanisms.

While there are benefits to transporting PDN packets directly over Ethernet, it should also be noted that it may not be a substitute when the backhaul path traverses multiple providers or network technologies. However, the advantages of virtualizing PDN connection handling with a centralized switch controller along with a carrier grade, routed Ethernet network are significant especially in small cell and future dense cell radio deployments.

Figure 6:
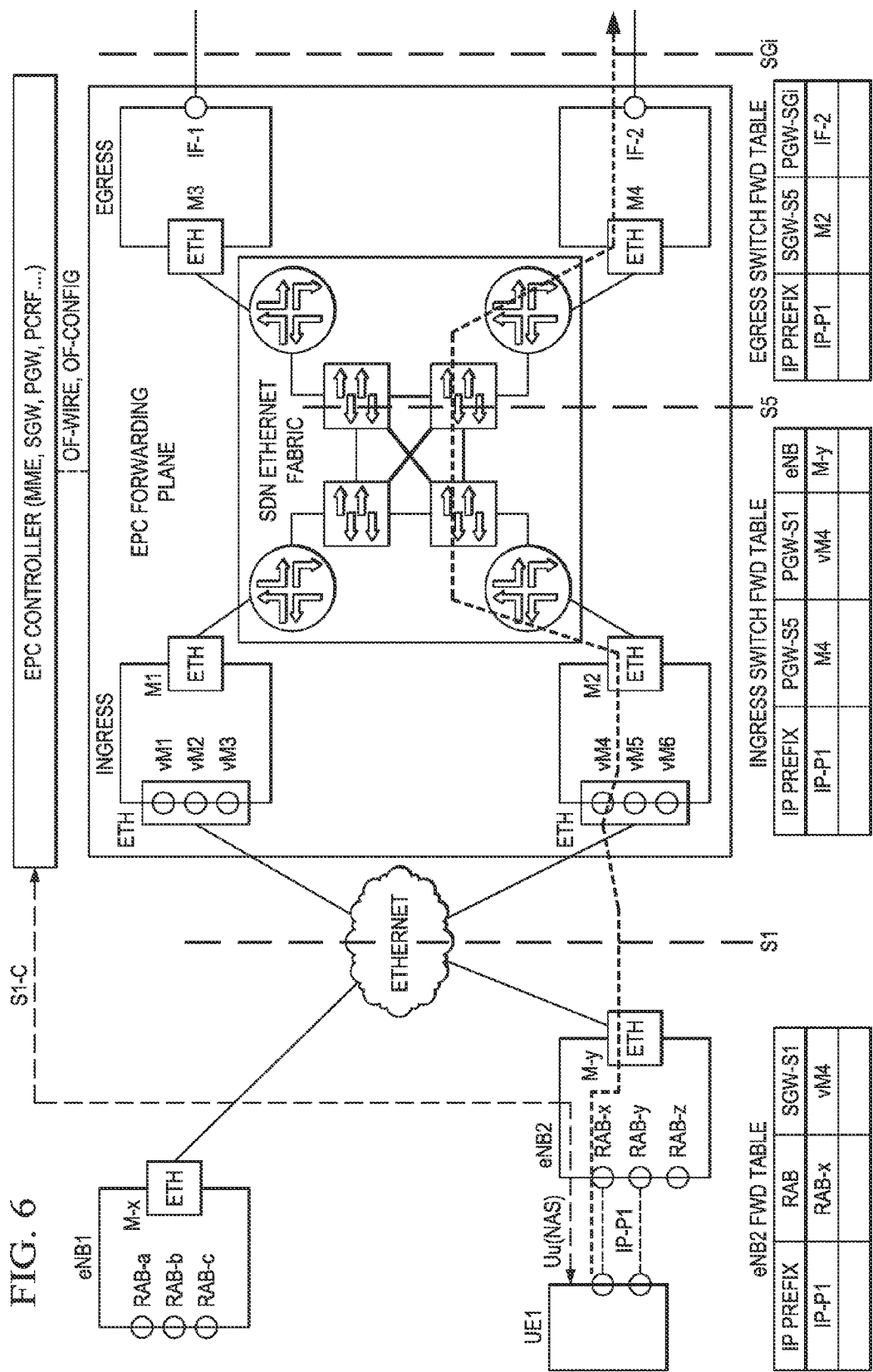
FIG. 6 illustrates a connection model (and architecture)

FIG. 6 illustrates a connection model (and architecture) in accordance with the present disclosure. This connection model provides a PDN bearer between UE1, eNB2 and the EPC/SDN forwarding plane in the EPC Controller (equivalent to SGW, PGW). Control plane protocols and mechanisms (e.g., NAS, S11, S5) are not changed.

As shown, a radio bearer exists between UE1-eNB2. From the eNB interface to SGi interface, an Ethernet transport plane is utilized through an Ethernet network. (Note: VLANs may be setup per class of service for forwarding with QoS—but they are not setup per user.) Virtual MACs are used to provide support for private IP addresses, etc. The connection table at each of the switches (eNB, EPC Ingress, EPC Egress) is generated using control protocol signaling (S1-C, OF). No changes are made to control protocols from the UE (Uu, S1-C).

Figure 7:
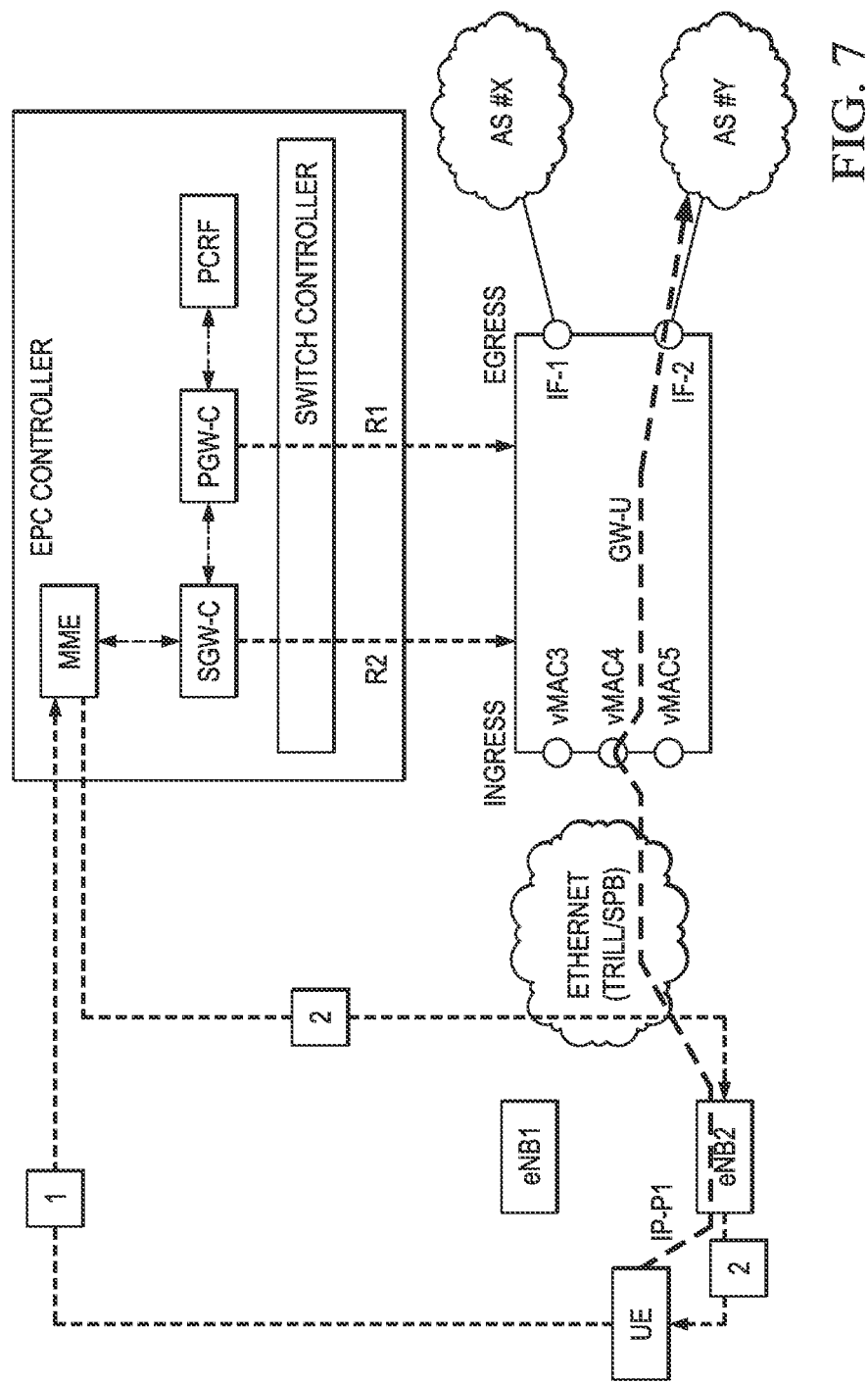
FIG. 7 illustrates a general configuration for UE attach and handover in accordance with one embodiment of present disclosure.

FIG. 7 illustrates a general configuration for UE attach and handover using Ethernet transport in accordance with the present disclosure. When the UE signals to attach to the network (Attach Request), the EPC controller handles the connection control, mobility aspects, policy authorization, etc., and sets up the path for the flow in the EPC (GW-U). The EPC controller then notifies the eNB (Attach Accept/Initial Context Setup). Since the path from eNB to the SGi interface is Ethernet, Initial Context Setup is enhanced to send (Ethernet) connection identifiers (including virtual MAC) corresponding to the PDN connection in the control channel. For a roaming user, the EPC controller sets up only the SGW part of the PDN and uses the existing GTP-u based tunnel (S8 interface).

For handover within a single provider network, the MME performs path switching. Building the transport path only requires inserting the new entry to forwarding tables in eNB, Ingress of GW-U. No GTP-c signaling is performed.

Figure 8:
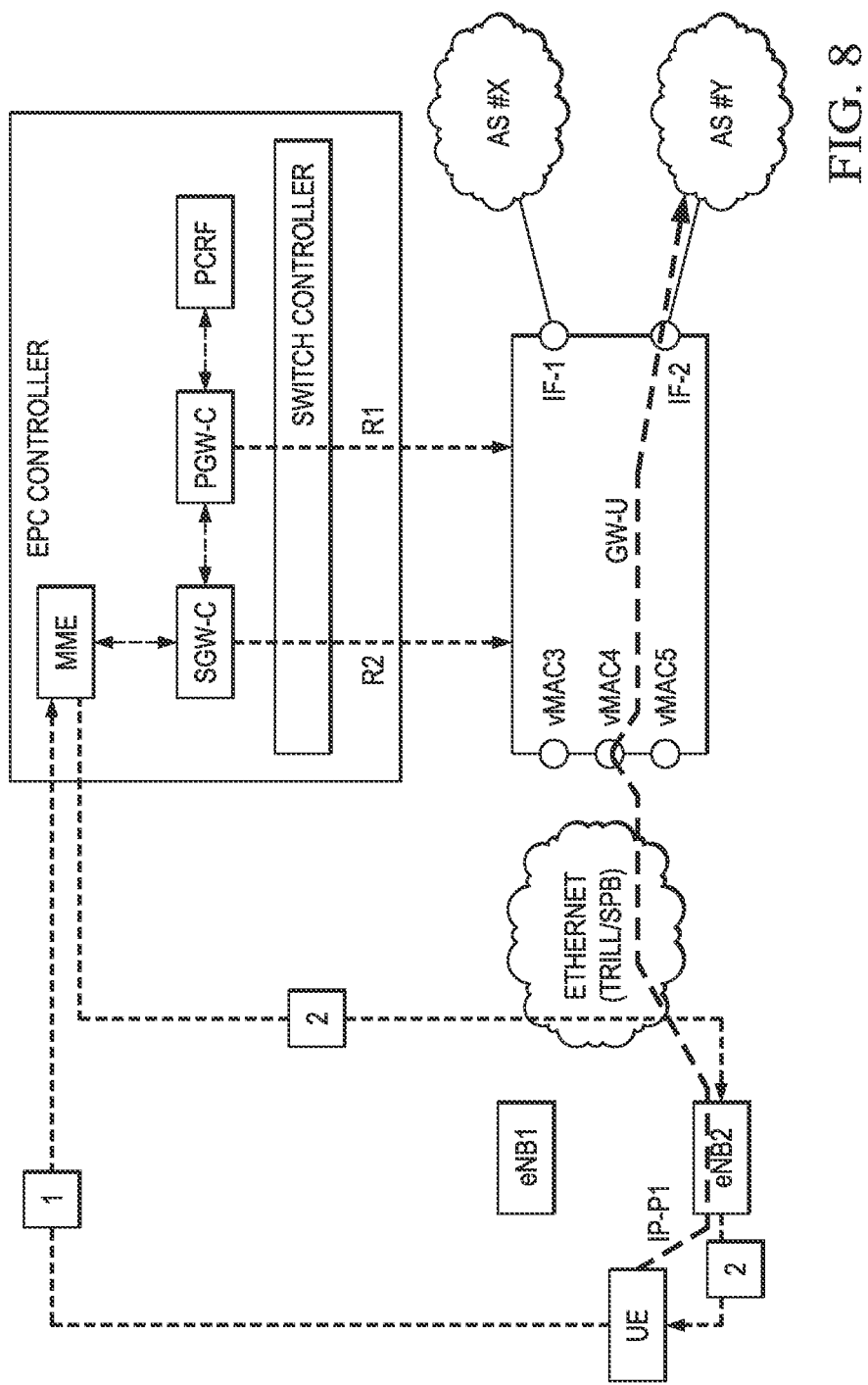
FIG. 8 illustrates signal flow for UE attachment in accordance with one embodiment of present disclosure.

FIG. 8 illustrates signal flow for UE attachment.

1. UE Attach Request (IMSI, APN, PCO, QoS, bearer-context (RAB), . . . ) from UE to MME—no change in 3GPP:

EPC controller software: MME (select PGW, SGW, send request to SGW-C).

SGW-C (select local ports, select data ports, send request to PGW-C).

PGW-C (allocate IP prefix, select local ports, program fwd table, reply to SGW-C).

R1: Program Fwd table: {Prefix=IP-P1, SGi=IF-2, S5=M2}.

SGW-C (program fwd table, reply to MME).

R2: Program Fwd table {Prefix=IP-P1, S1=vM4, S5=M4, eNB=M-y}.

2. Attach Accept/Initial Context Setup Request (APN, TAI, PDN, EPS-bearer, . . . , EPC-cookie {EPS-bearer, vMAC4}):

eNB associates EPS-bearer, vMAC, RAB and builds forwarding table.

At this point, the PDN/bearer from UE to SGi interface has been setup.

Figure 9:
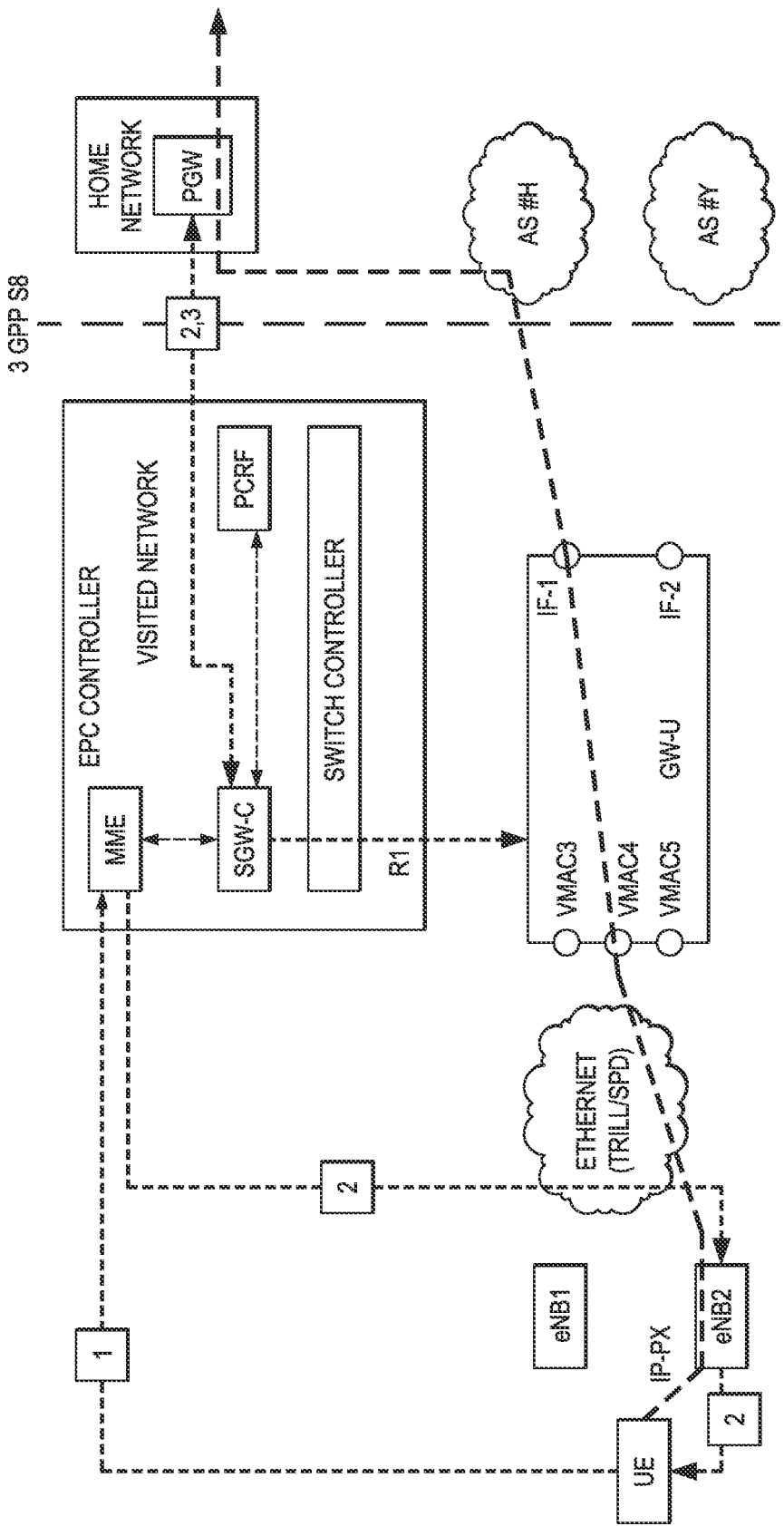
FIG. 9 illustrates signal flow for UE attachment (for a roaming UE) in accordance with one embodiment of present disclosure.

FIG. 9 illustrates signal flow for UE attachment (for a roaming UE).

1. Attach Request (IMSI, APN, PCO, QoS, bearer-context (RAB), . . . ) [note: authentication sequence—not described]:

EPC controller software: MME (select PGW, SGW, send request to SGW-C).

SGW-C (select local ports, select data ports, send request to PGW-C).

R1: Program Fwd table: {Prefix=IP-P1, SGi=IF-2, S5=M2}.

2. SGW-C request to PGW is a GTP-c request to Create Session Request.

3. PGW in home network responds to the SGW-C (GTP-c). SGW-C (program fwd table, reply to MME).

R2: Program Fwd table {Prefix=IP-P1, S1=vM4, S5=M4, eNB=M-y}.

2. Attach Accept/Initial Context Setup Request (APN, TAI, PDN, EPS-bearer, . . . , EPC-cookie {EPS-bearer, vMAC4}).

At this point, the PDN/bearer from UE to SGi interface has been setup.

Figure 10:
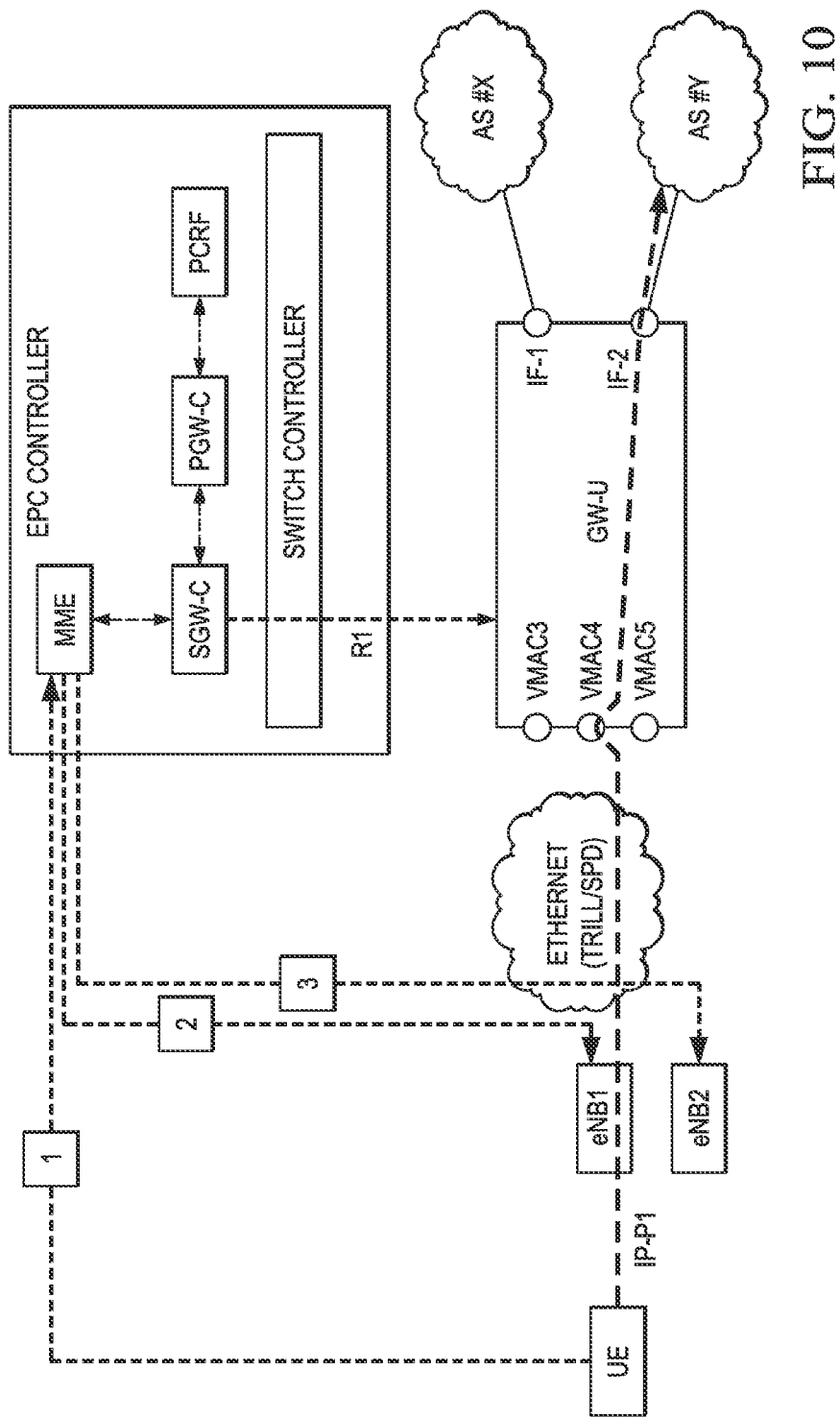
FIG. 10 illustrates signal flow for UE handover within the network/EPC in accordance with one embodiment of present disclosure.

FIG. 10 illustrates signal flow for UE handover within the network/EPC.

1. Path Switch Request (IMSI, TAI, list of PDN to be switched):

Controller software: MME sends Modify Bearer information to SGW-C.

R1: End-marker to eNB1.

R1: Program Fwd table {Prefix=IP-P1, S1=vM4, S5=M4, eNB=M-x} (eNB1 table).

All other aspects of session handling—tracking area, ISR, CSG, etc. are handled in the virtualized EPC controller.

2. Path Switch Request Ack ( . . . , EPC-cookie {EPS-bearer, vMAC4 }):

eNB1 associates EPS-bearer, vMAC, RAB and builds forwarding table.

3. Release Resource ( . . . , EPC-cookie {EPS-bearer, vMAC4}):

eNB2 disassociates EPS-bearer, vMAC, RAB and revises forwarding table.

The foregoing architecture and process/signal flows provide various advantages and novel features. PDN connections are transported directly over Ethernet between the eNB and SGi interface (interface to external network). Connection paths between eNB and the external network are mapped to create point-to-point PDN/virtual connections per UE (over Ethernet). S1-C signal is enhanced between the MME and the eNB to carry Ethernet connection points.

Figure 11:
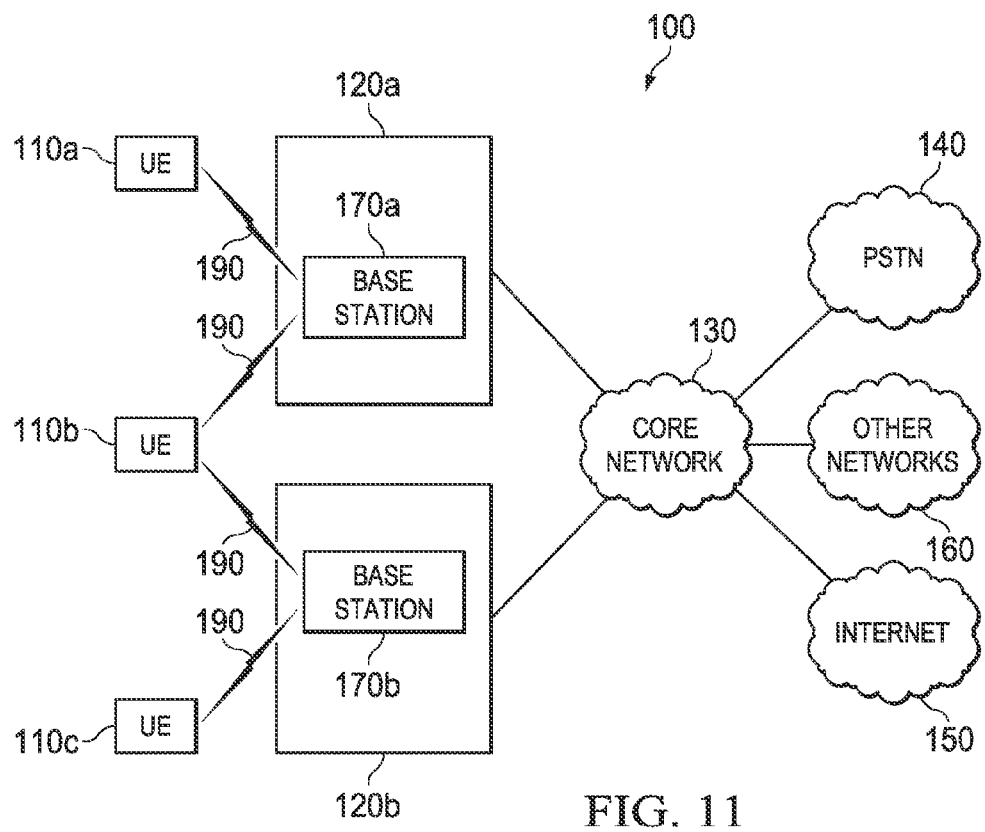
FIG. 11 illustrates one example of a communication system.

The above identified methods/flows and devices may be incorporated into a wireless communications network and implemented in devices, such as that described below, and in the drawings below:

FIG. 11 illustrates an example communication system 100 that uses signaling to support advanced wireless receivers according to this disclosure. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes user equipment (UE) 110a-110c, radio access networks (RANs) 120a-120b, a core network 130, a public switched telephone network (PSTN) 140, the Internet 150, and other networks 160. While certain numbers of these components or elements are shown in FIG. 6, any number of these components or elements may be included in the system 100.

The UEs 110a-110c are configured to operate and/or communicate in the system 100. For example, the UEs 110a-110c are configured to transmit and/or receive wireless signals. Each UE 110a-110c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 120a-120b here include radio access network nodes, for example base stations 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router.

In the embodiment shown in FIG. 11, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and UEs implement LTE, LTE-A, and/or LTE-B. Of course, other multiple access schemes and wireless protocols may be utilized.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols.

Although FIG. 11 illustrates one example of a communication system, various changes may be made to FIG. 11. For example, the communication system 100 could include any number of UEs, base stations, networks, or other components in any suitable configuration, and can further include the EPC illustrated in any of the figures herein.

Figure 12A:
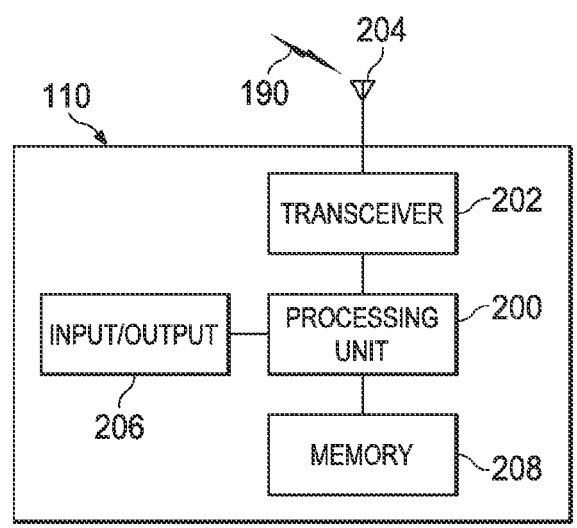
FIGS. 12A and 12B illustrate example devices that may implement the methods and teachings according to this disclosure.
Figure 12B:
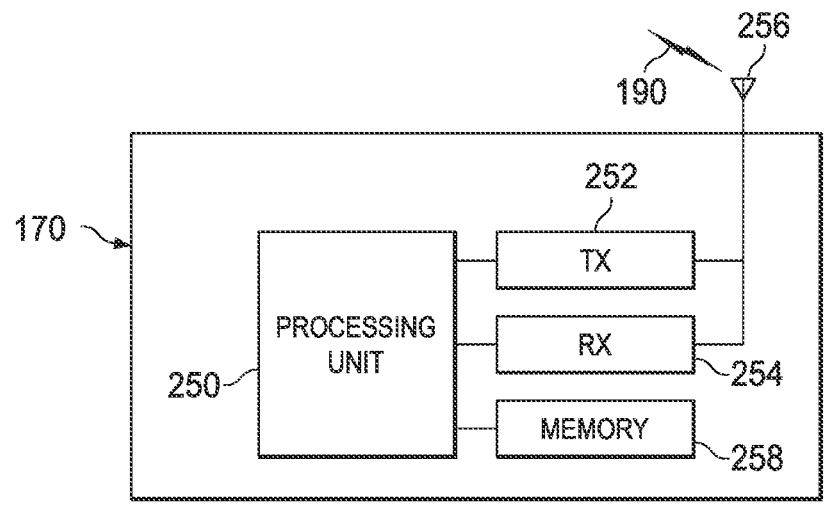

FIGS. 12A and 12B illustrate example devices that may implement the methods and teachings according to this disclosure. In particular, FIG. 12A illustrates an example UE 110, and FIG. 12B illustrates an example base station 170. These components could be used in the system 100 or in any other suitable system.

As shown in FIG. 12A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206. The input/output devices 206 facilitate interaction with a user. Each input/output device 206 includes any suitable structure for providing information to or receiving information from a user, such as a speaker, microphone, keypad, keyboard, display, or touch screen.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 12B, the base station 170 includes at least one processing unit 250, at least one transmitter 252, at least one receiver 254, one or more antennas 256, and at least one memory 258. The processing unit 250 implements various processing operations of the base station 170, such as signal coding, data processing, power control, input/output processing, or any other functionality. The processing unit 250 can also support the methods and teachings described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding UEs 110 and base stations 170 are known to those of skill in the art. As such, these details are omitted here for clarity.

In addition, one or more of the EPC, EPC controller, and (centralized) switch controller may include various devices or components as set forth in FIG. 12B (no antenna required, the TX and RX complies which EPC protocol standard such as specified in 3GPP), such as a processor or processing system, memory, network interface, I/O devices, and/or a wireless transmitter/receiver, or combination thereof. The processor herein can be configured to couple to a memory and execute various embodiments related to methods or processes that are required by one or more of the EPC, EPC controller, and (centralized) switch controller as mentioned in this disclosure.

Figure 13:
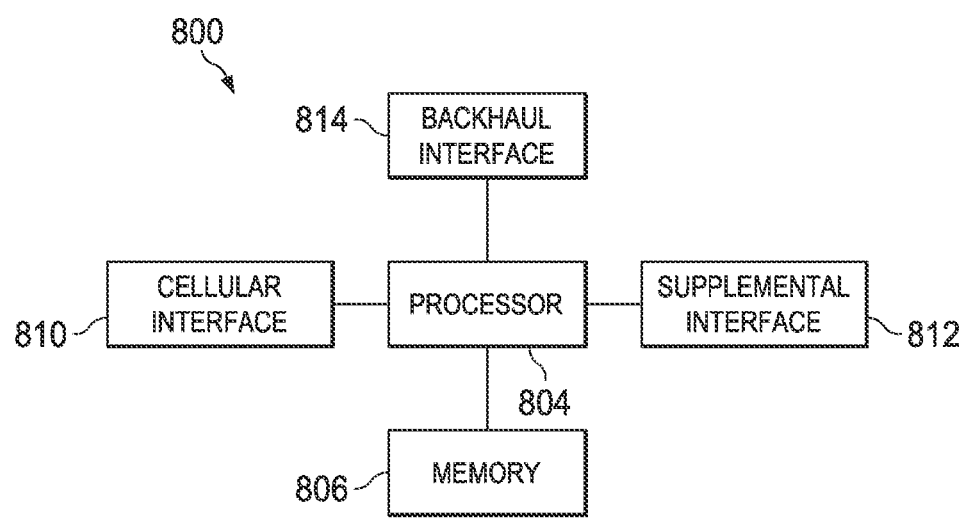
FIG. 13 illustrates an example of a processor system.

FIG. 13 illustrates a processor 804 configured to interface with memory 806, a cellular interface 810, a supplemental interface 812, and a backhaul interface 814 that may implement the methods and teachings according to this disclosure.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A communications network apparatus comprising:
a centralized switch controller at an evolved packet core (EPC) site, configured to:
communicate with at least one of an evolved Node B (eNB) of a radio access network (RAN), or an Ethernet switching network device of an Ethernet switching network, via which packet data is carried on a packet data network (PDN) connection between the eNB and an external packet data network; and
configure flow table entries for the PDN connection between the eNB and the external packet data network in a forwarding table in a last one of the eNB or the Ethernet switching network device, to enable the PDN connection, over Ethernet communication, between the eNB and the external packet data network via the Ethernet switching network, the flow table entries comprising a virtual media access control (MAC) reference corresponding to the PDN connection between the eNB and the external packet data network; and
an EPC controller at the EPC site configured to:
communicate with the eNB using connection session control functions; and
communicate with the centralized switch controller to setup a transport path for the PDN connection in accordance with the flow table entries.

2. The communications network apparatus of claim 1, wherein the centralized switch controller is configured to configure the flow table entries for the PDN connection in response to a request from the EPC controller to setup the PDN connection.

3. The communications network apparatus of claim 1, wherein the centralized switch controller is configured to set up the transport path between the eNB and a gateway at the EPC site, the gateway configured to route the PDN connection and provide access to an external network.

4. The communications network apparatus of claim 3, wherein the transport path comprises virtualized network segments for the PDN connection, wherein flow tables for the virtualized network segments along the transport path are grouped into a point-to-point flow table binding for the PDN connection.

5. The communications network apparatus of claim 3, wherein the EPC controller is configured to generate a virtual tunnel endpoint identity (TEID) and associate the virtual TEID to connection identifiers in the transport path.

6. The communications network apparatus of claim 1, wherein the centralized switch controller is configured to setup forwarding tables for the PDN connection based on translations between a radio access bearer (RAB) identity and at least one of a user internet protocol (IP) address or a virtual MAC address.

7. The communications network apparatus of claim 1, wherein the Ethernet switching network device comprises at least one of a first anchor configured to anchor an IP session, or a second anchor configured to support mobility of a user equipment (UE) attached to the RAN.

8. The communications network apparatus of claim 7, wherein the centralized switch controller is configured to provide the EPC controller with local identifiers by which PDN connection segments of the PDN connection are identified, and wherein the local identifiers at the first anchor and the second anchor are associated with a virtual tunnel endpoint identity (TEID) created by the EPC controller.

9. An Ethernet switching network device, in an Ethernet switching network, and coupled between an evolved Node B (eNB) of a first radio access network (RAN) and an external packet data network, wherein the Ethernet switching network device comprises:
a processor; and
a non-transitory computer readable storage medium storing programming for execution by the processor, the programming including instructions for:
forwarding packet data carried on a packet data network (PDN) connection between the eNB and the external packet data network in a transport path setup in accordance with a forwarding table comprising flow table entries configured by a controller at an evolved packet core (EPC) site for the PDN connection, the flow table entries comprising a virtual media access control (MAC) address corresponding to the PDN connection.

10. The Ethernet switching network device of claim 9, wherein the controller at the EPC site comprises:
a centralized switch controller coupled to an EPC controller having connection session control functions, the centralized switch controller configured to, in response to a request of setup of the PDN connection, configure the flow table entries for the PDN connection.

11. The Ethernet switching network device of claim 9, wherein the programming includes further instructions for:
forwarding the PDN connection based on translations between a radio access bearer (RAB) identity and at least one of an end-user internet protocol (IP) address or a virtual MAC address.

12. The Ethernet switching network device of claim 11, wherein the virtual MAC address identifies a PDN connection segment between the Ethernet switching network device and another network device serving the PDN connection.

13. The Ethernet switching network device of claim 9, further comprising one of a first anchor configured to anchor an IP session, or a second anchor configured to support mobility of a user equipment (UE) attached to the first RAN.

14. A radio access network node for use in a first radio access network (RAN) that is configured to be coupled to an external packet data network (PDN), and configured to establish a PDN connection via an Ethernet switching network to an interface of the external PDN, the radio access network node comprising:
a receiver configured to receive a first data packet of the PDN connection from a user equipment (UE);
an Ethernet interface for communicating with the Ethernet switching network;
a processor coupled to the receiver and the Ethernet interface, and configured for:
converting the received first data packet to an Ethernet formatted packet; and
forwarding the Ethernet formatted packet via the Ethernet switching network to the interface of the external PDN in a transport path set up in accordance with a forwarding table comprising flow table entries that are configured by a controller at an evolved packet core (EPC) site for the PDN connection, the flow table entries comprising a virtual Media Access Address (MAC) corresponding to the PDN connection.

15. The radio access network node of claim 14, wherein the processor is configured for obtaining from the controller at the EPC site a virtual tunnel endpoint identity (TEID) from the external PDN, and correlating the virtual TEID to the flow table entries for the PDN connection.

16. The radio access network node of claim 14, wherein the processor is further configured for correlating a virtual TEID in a flow table modification request with a same virtual TEID in the radio access network node.

17. A system for controlling a first radio access network (RAN) comprising an evolved Node B (eNB) that is configured to communicate to an external Packet Data Network (PDN) via an Ethernet switching network to enable a PDN connection over Ethernet communication, the system comprising:
an Evolved Packet Core (EPC) controller at an EPC site and having connection session control functions; and
a centralized switch controller at the EPC site and coupled to the EPC controller, wherein the centralized switch controller is configured to, in response to a request from the EPC controller to setup a PDN connection between the eNB and the external PDN, configure flow table entries for the PDN connection between the eNB and the external PDN in a forwarding table in a last one of the eNB and the Ethernet switching network device to enable a transport path for the PDN connection, over Ethernet communication, between the eNB and the external PDN via the Ethernet switching network, the flow table entries comprising a virtual media access control (MAC) reference corresponding to the PDN connection between the eNB and the external PDN.

18. The system of claim 17, wherein the centralized switch controller is configured to provide the EPC controller with a local identifier by which a PDN connection segment is identified, and wherein the EPC controller is configured to generate a virtual tunnel endpoint identity (TEID) and associate the virtual TEID to the local identifier.

19. The system of claim 17, wherein, in response to an attachment port to the Ethernet switching network device needing to be changed, the EPC controller is configured to assign a new TEID; and instruct the centralized switch controller to setup new path between a new eNB and the external PDN.

* * * * *